Nov. 29, 1955  J. H. BORNZIN  2,725,009
TINE FEEDER FOR HAY BALERS
Filed April 9, 1954  2 Sheets-Sheet 1
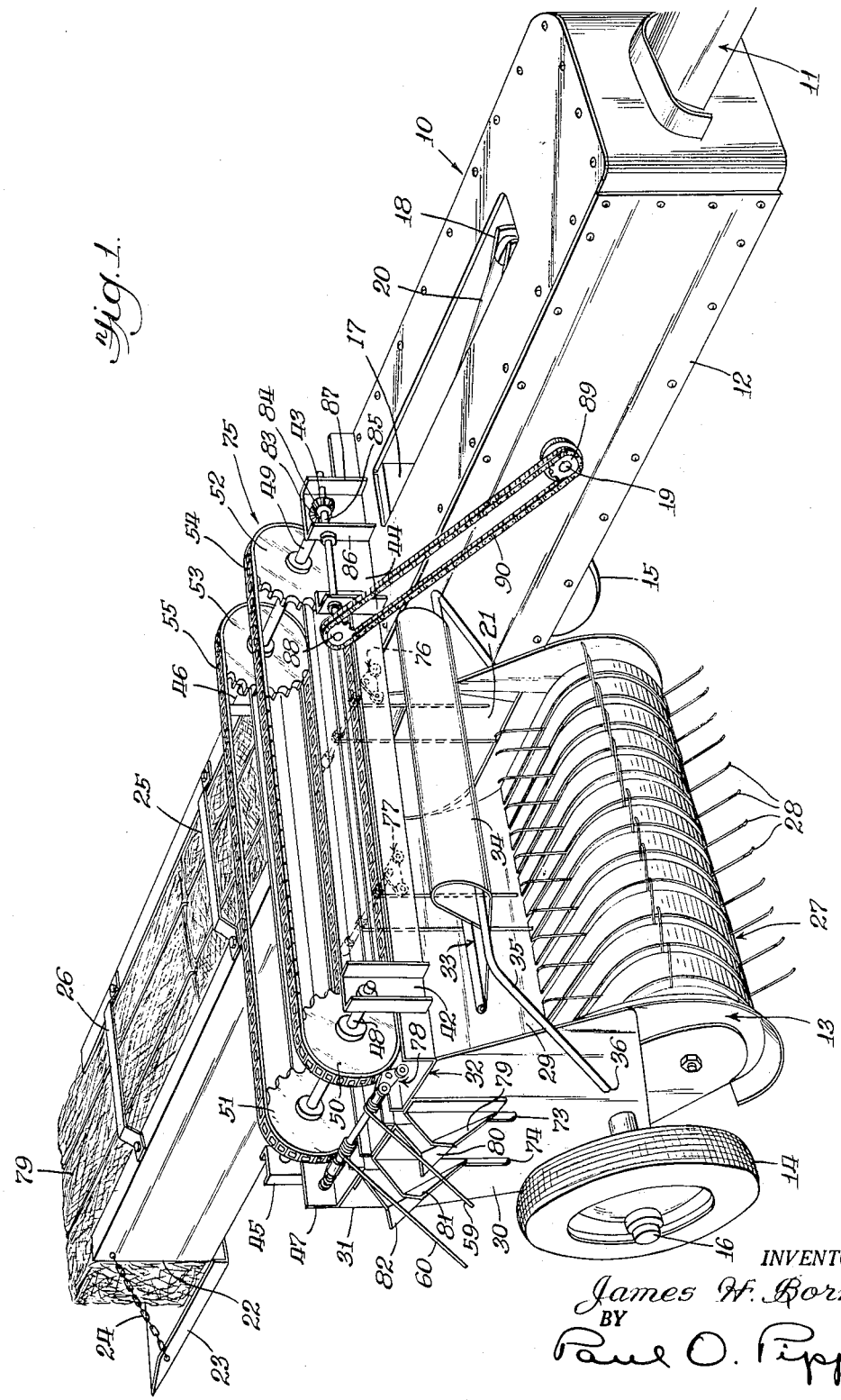
INVENTOR.
James H. Bornzin
BY
Paul O. Pipper
Atty.

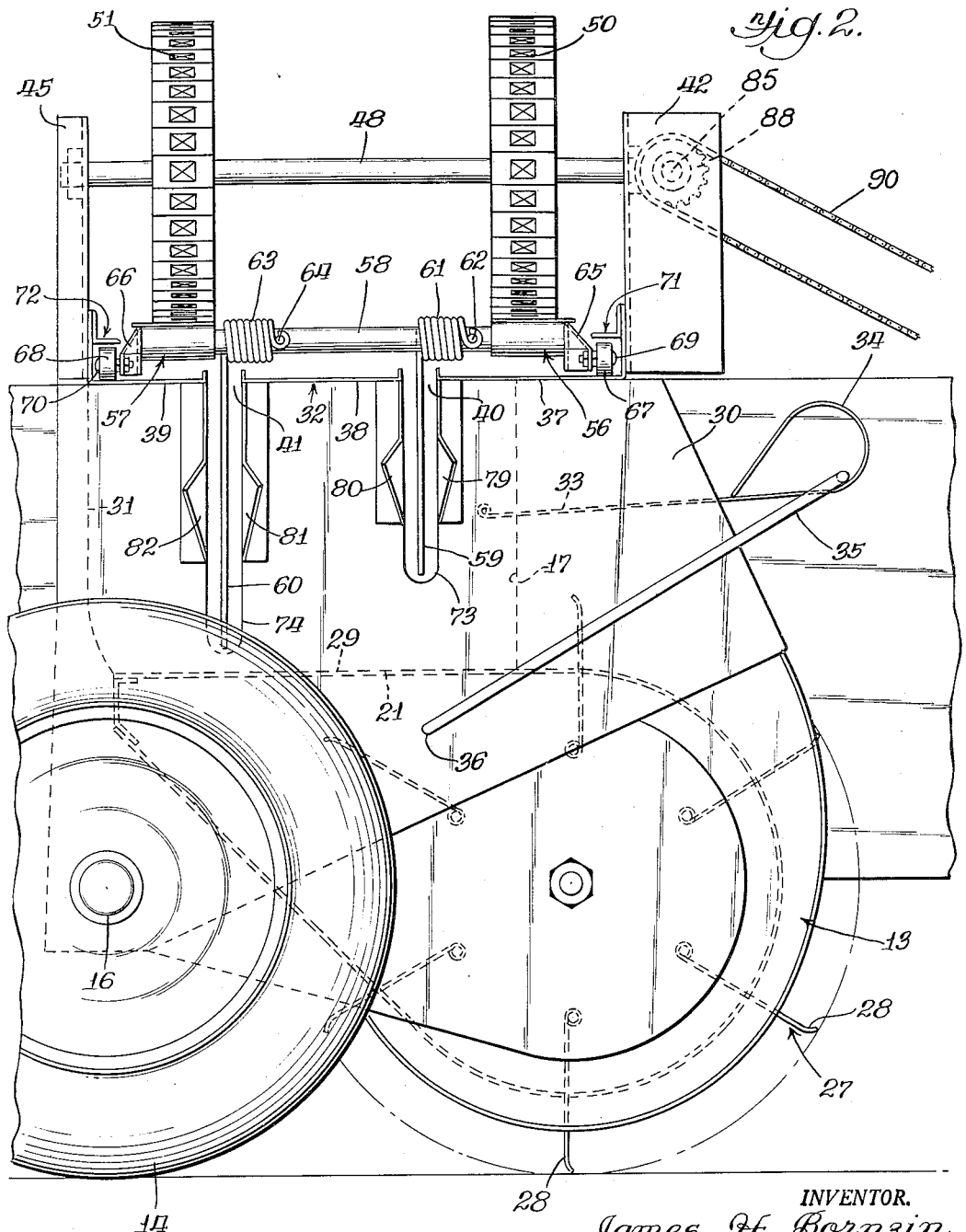

United States Patent Office 2,725,009
Patented Nov. 29, 1955

2,725,009

TINE FEEDER FOR HAY BALERS

James H. Bornzin, Memphis, Tenn., assignor to International Harvester Company, a corporation of New Jersey Application April 9, 1954, Serial No. 422,004

4 Claims. (Cl. 100—189)

This invention relates to a new and improved tine feeder for hay balers.

There have been many mechanisms made to effect an efficient feeding of hay or other material to be baled into the bale-compressing chambers of field traversing hay balers. Such hay balers are employed to pass through a field of hay which has been previously cut and the hay arranged in windrows. The machine must therefore be capable of picking the hay up from the windrows and depositing it in a relatively smooth flowing manner into the chamber where it is compressed and formed into the desired bale formation. Usually this feeding mechanism requires a combination of elements and the assignee of the present invention, International Harvester Company, is at present commercially manufacturing balers of this type which utilize various elements in a manner shown in the Crumb et al. Patent 2,450,082, granted September 18, 1948.

It is therefore a principal object of the present invention to provide a feeding mechanism for the platform of a field traversing hay baler which will jointly act to clear the entire platform of hay and deliver it into the bale-compressing chamber and simultaneously without interrupting the operation thereof permit continuous reciprocation of a hay-compressing plunger within the bale-forming chamber.

An important object of this invention is the provision of an endless chain conveyor having intermittent tines thereon arranged and constructed to sweep across an entire baler platform and into the bale-forming chamber in timed relationship with a reciprocating plunger within the bale-forming chamber in such a manner that the portion of the endless chain conveyor having no tines thereon will be adjacent the bale-forming chamber at a time when the plunger is extended in its compression stroke.

Another and further important object of this invention is to supply a field traversing hay baler with a platform pick-up mechanism arranged and constructed to feed the hay from a windrow rearwardly onto a baler platform whereupon it is fed laterally across the platform and into a bale-forming chamber which extends longitudinally of the line of the draft of the machine by means of an endless chain conveyor having strategically placed tines thereon in such a manner that the endless conveyor may be timed with respect to a reciprocating plunger in the longitudinally extending bale-forming chamber whereupon the tines avoid striking the bale-forming plunger.

Still another important object of this invention is to equip an endless chain conveyor with irregularly spaced apart tines thereon for the purpose of permitting an interruption of the feeding of hay or other material to be baled from the platform to the bale-forming chamber during the compression stroke of a plunger.

A still further important object of this invention is to provide a transversely positioned endless chain conveyor for baler platforms having dual tines placed thereon in such a manner that a substantial portion of the length of the chain has no tines thereon and further in that the forwardly disposed tines of each set of dual tines is substantially shorter in length than the rearmost tines to permit a certain portion of the hay to pass the foremost tines and be engaged by the rearwardly positioned tines so that a substantially uniform quantity of hay is delivered throughout the length of the hay opening in the bale-forming chamber.

Other and further important objects and advantages will become apparent from the disclosures in the following specification and accompanying drawings.

Fig. 1 is a perspective view of a hay baler incorporating the principles of this invention.

Fig. 2 is a side view of a portion of the baler as shown in Fig. 1.

As shown in the drawings, the reference numeral 10 indicates generally a field traversing hay baler having a hitch mechanism 11 at the forward end for the purpose of attaching the baler to a tractor or the like which must be employed to provide the motive power for pulling the hay baler through a field of hay to be baled. The baler 10 includes a longitudinally extending bale-forming chamber 12 and a laterally extending hay harvesting mechanism 13. The hay baler 10 is carried on spaced-apart ground-engaging wheels 14 and 15. The wheel 14 is disposed at the lateral outer end of the harvesting portion 13 of the hay baler and the wheel 15 is disposed adjacent the outer side of the bale-forming chamber 12. The wheels 14 and 15 are mounted on a transversely extending axle 16 which provides the carrying means for the entire hay baler.

The longitudinally extending bale-forming chamber 12 houses a reciprocating plunger 17 which is driven by a crank 18. The crank is mounted on a transversely extending shaft 19 within the chamber 12. The baler may have a separate engine mounted thereon for the purpose of driving the plunger or the source of driving power may be secured from the power take-off shaft coming from the pulling tractor. In the present instance the power take-off means is included in the hitch mechanism 11. Driving elements (not shown) are employed for transmitting rotational drive from the tractor to the shaft 19 and thus also the crank 18. A pitman 20 joins the crank 18 to the plunger 17 causing the plunger to move rearwardly in a compression stroke to form the hay bales within the chamber 12 and to move forwardly to permit the admission of more hay to the chamber 12 for subsequent compression and bale formation. An opening 21 is provided in the side of the longitudinally extending bale-forming chamber 12 adjacent the harvesting portion 13. Still further the chamber 12 has a bale discharge opening 22 at the rearward end portion and, as shown in Fig. 1, a guide pan 23 held by chains 24 is employed to direct the discharging hay bales either upwardly or downwardly as desired. The side walls of the chamber 12 are held together at the discharge end of the chamber by means of tie straps 25 and 26 in order to maintain proper compression on the hay during bale formation.

The harvesting portion 13 of this hay baler includes a cylinder type pick-up 27 having a radially extending spring finger 28 for the purpose of sweeping under the hay in a windrow and carrying that hay up over the top of cylinder 27 and thence rearwardly onto a horizontally disposed platform 29. The platform 29 is substantially enclosed by means of an end wall 30, a back wall 31, a top 32 and the side wall of the bale-forming chamber 12 on the inner side thereof. A hay hold-down or packer member 33 is hingedly mounted at its forward end 34 about a bail-like member 35, the arms of which are fixed to the opposite ends of the harvesting portion 13 as shown at 36. It is the function of the hold-down packer 33 to cooperate with the cylinder pick-up mechanism 27 to feed the hay taken from the windrow and guide it toward the rear of the deck or platform 29.

It is the means by which this deck 29 is intermittently cleared and the hay thereon moved into the bale-forming chamber 12 that constitutes the primary purpose and function of this invention. The top 32 consists of three U-shaped channel members 37, 38 and 39. The channels 37 and 38 are spaced apart in order to define a slot or passage therebetween designated by the numeral 40. Similarly the U-shaped channels 38 and 39 are spaced apart forming a slot or channel 41. The bases of the channels 37, 38 and 39 are in a single horizontal plane and together constitute the top 32 of the platform enclosure of this harvesting portion 13. Vertical spaced apart supporting posts 42 and 43 in the form of channel members are shown fastened to the upwardly extending front flange 44 of the channel 37. Similarly vertically disposed channel member posts 45 and 46 are affixed to the upwardly extending back flange 47 of the channel member 39. The post 45 is in longitudinal alignment with the post 42 and similarly the post 46 is in longitudinal alignment with the post 43. Shaft members 48 and 49 are journally mounted in and between the posts 42 and 45 and 43 and 46 respectively. Spaced apart sprockets 50 and 51 are mounted on the shaft 48 and sprockets 52 and 53 are mounted on the shaft 49. The sprockets 50 and 52 are in transverse alignment and similarly the spaced apart sprockets 51 and 53 are in lateral alignment. Each pair of sprockets 50 and 52 and 51 and 53 carry endless chains 54 and 55 respectively. The elements just described combined to constitute an endless conveyor which enables the baler mechanism of this invention to feed hay from the platform 29 into the bale-forming chamber 12 by means of feeding tines thereon.

Fig. 2 best shows the application of the feeding tines to this endless conveyor. Special chain links 56 and 57 are adapted to carry a cross shaft member 58 in spaced apart relationship from the pivoting of the special links on the chains. Depending from this offset shaft 58 are a front tine 59 and a rear tine 60. The tine 59 includes a spring winding 61 around the shaft 58 and an end anchoring of the spring winding on a fixed pin 62 in the shaft 58. Similarly, the rearmost tine 60 has a spring winding 63 about the shaft 58 terminating in an attachment to a fixed pin 64 on the shaft 58. Thus the tines 59 and 60 have a yieldable mounting on the cross shaft 58 in such a manner that they may yield rearwardly upon the application of an undue amount of force. This, of course, prevents breakage of the tines and permits the user of the hay baler to remove stones or other foreign objects which may be picked up and deposited on the platform by the cylinder mechanism 27 prior to serious damage to other mechanisms of the hay baler. It should further be noted that the forward tine 59 is substantially shorter in length than the rear tine 60 to enable a portion of the hay, being fed rearwardly by cooperation of the cylinder pick-up 37 and a hold-down packer 33, to reach the rearward portion of the platform. Thus the hay being delivered to the bale-forming chamber 12 is distributed substantially uniformly over the length of the side opening 21 in the bale-forming chamber to thereupon contribute to more uniformly dense hay bales and simultaneously a uniform clearing of the hay from the platform without undue taxing of any one set of tines.

The special chain links 56 and 57 are also equipped with outwardly and oppositely disposed extension members 65 and 66 respectively. These extensions are placed on the links 56 and 57 at a position spaced to the other side of the link pivot points from the attachment of the tine carrying shaft 58. These extension members are adapted to journally carry rollers 67 and 68 by means of bolts 69 and 70. Guide members in the form of angle irons 71 and 72 are provided on the front and rear of the platform top 32 at a position spaced above the top 32 as defined by the channel members 37, 38 and 39. The rollers 67 and 68 are arranged and constructed to ride beneath these flange-like guides 71 and 72 and thereupon maintain the full extension of the tines 59 and 60 during the lateral travel of the tines across the platform deck 29. The engagement of the rollers with the guide tracks causes a "rocker arm" action of the tines 59 and 60 by reason of the positioning of the rollers and the tine carrying shaft 58 on opposite sides of the pivot points of the special chain links. Further, as shown in Fig. 2 the end wall 30 of the harvester portion 13 is provided with vertically disposed upwardly opening slots 73 and 74 to permit the entrance of the tines 59 and 60 respectively as they come down and around into the outer end of the platform adjacent the end wall 30. The tines travel across the top of the deck 29, thence through the opening 21 in the bale-forming chamber 12, thereupon out the far side of the top of the bale-forming chamber and thence across the top of the endless chains 54 and 55 for reentry into the openings 73 and 74.

As shown in Fig. 1 there are only three sets of the dual tines 59 and 60 on the entire endless conveyor. For purposes of convenience the endless conveyor will be generally designated by the numeral 75 and the dual tine elements will be referred to as 76, 77 and 78. It will be noted that these dual tine elements are substantially equally spaced apart from each other but they are not uniformly spaced about the entire endless conveyor 75. Rather they are intermittently or irregularly spaced so that a substantial portion of the endless conveyor 75 has no tines whatsoever. It is this feature that permits the uninterrupted operation of the endless conveyor 75 and yet provides for interrupted feeding of hay from the platform 29 into the bale-forming chamber 12. The reciprocating plunger 17 must of necessity move rearwardly past the forward edge of the side opening 21 in order to compress the hay into bales such as shown at 79. Thus it is essential that no tines pass into or through the bale-forming chamber 12 during the rearward or compression stroke of the plunger 17. It is imperative therefore that the endless chain conveyor 75 be operated in timed relationship with the reciprocation of the plunger 17 in such a manner that the dual tine elements 76, 77 and 78 pass across the deck 29 and into the bale chamber 12 at a time when the plunger is forwardly disposed within the chamber 12. Further, all of these dual tine elements must have cleared through the bale-forming chamber prior to the compression stroke of the bale compressing plunger 17. There is thus accomplished an intermittent feeding of hay from the harvesting portion of a pick-up hay baler into a bale-forming chamber in an intermittent manner with a minimum of elements and without undesirable stopping and starting of various drive mechanisms. The vertical slots 73 and 74 in the end wall 30 are equipped with flaring guide walls 79 and 80 and 81 and 82 respectively to facilitate guiding movement of the outwardly extending tines 59 and 60 into the enclosure of the harvester platform. The timing of the movement of the conveyor 75 with reciprocation of the plunger is accomplished by driving the conveyor chain from the plunger drive. A bevel gear 83 on the forward end of the shaft 49 is in cooperative engagement with a bevel gear 84 disposed at right angles to the bevel gear 83. A transversely disposed shaft 85 journally carried in spaced apart supports 86 and 87 constitutes the carrying member for the bevel gear 84. A sprocket 88 is also fixed to the shaft 85 at a position spaced from the bevel gear 84. A sprocket 89 on the plunger crank shaft 19 lies in the same fore and aft plane as the sprocket 88 and thus by means of a chain 90 drive is imparted from the shaft 19 to the shaft 85. It follows that the conveyor 75 is driven from the plunger crank shaft 19. It should be understood that the timing between the plunger and tine conveyor 75 may be changed to utilize different tine conveyor speeds. In other words, it is not material to this invention whether the tine conveyor completes one revolution on every reciprocation of the plunger or whether it only makes a complete revolution on every two or three reciprocations of the plunger. It is important that the tine conveyor always be without tines feeding material at a time when the plunger is compressing material at the rear of its stroke.

In the operation of this hay baler it is pulled through a field of windrowed hay in such a manner that the cylinder pick-up 27 is in alignment with the hay windrow causing the radial fingers 28 to sweep the hay upwardly and over the cylinder 27 and thence rearwardly by reason of the guiding hold-down packer 33 and onto the horizontal deck 29. From this point the hay is fed intermittently into the bale-forming chamber 12 by reason of the dual tine elements in the endless conveyor which extends laterally of the hay baler and across the top thereof from the outer extremity of the harvester portion 13 to the outer extremity of the bale-compressing chamber 12. As previously stated a substantial portion of the endless conveyor 75 is devoid of radial tines thus permitting movement of the endless conveyor without the corresponding movement of hay from the platfrom deck 29 into the bale-forming chamber. This, of course, is to permit the plunger to make its compression stroke without interference from the tines as they feed hay into the bale-forming chamber. A further feature of the device which contributes an important part of the operation thereof is the differential in length between the front series of tines 59 and the rear series of tines 60. Thus when the dual tines 76, 77 and 78 are in the feeding position of the endless conveyor 75 as shown in Fig. 1 the hay being fed rearwardly onto the platform deck will be permitted uniform distribution of the hay from the front to the rear. If the front tines 59 are as long as the rear tines 60 they would constitute a complete damming of the flow of hay rearwardly of the platform. However, inasmuch as the front tines 59 are shorter than the rear tines 60 a substantial portion of the hay is permitted further rearward movement onto the platform for resultant transverse movement of the hay by the long rearmost tines 60 across the deck and into the bale-forming chamber 12.

Various details of construction may be varied throughout a wide range without departing from the principles disclosed herein and I, therefore, do not propose limiting the patent granted hereon otherwise than as necessitated by the appended claims.

What is claimed is:

1. A hay baler comprising a bale-forming chamber, a hay receiving platform extending outwardly from said bale-forming chamber, said bale-forming chamber having an opening adjacent the platform, a reciprocating plunger within said bale-forming chamber adapted to move past said opening, an endless conveyor extending along the platform and across the bale-forming chamber, a plurality of outwardly extending tines on said endless conveyor, said tines positioned at spaced intervals on said endless conveyor thereby leaving at least a portion of the endless conveyor without tines, said tines and said reciprocating plunger movable along intersecting paths, and said reciprocating plunger and the portion of the endless conveyor without tines being timed to move in the area of intersection of said paths concomitantly to preclude interference in movement of the reciprocating plunger and the tines, the bale-forming chamber extending longitudinally of the line of draft of the hay baler and the platform extending laterally from the bale-forming chamber, said endless conveyor being positioned on top of the platform and bale-forming chamber and the tines depending down into the platform and chamber for sweeping hay from the platform into the chamber.

2. A device as set forth in claim 1 in which the endless conveyor comprises longitudinally spaced apart endless chains and the outwardly extending tines comprise dual tine means hinged to said endless chains, each of said dual tine means having one tine thereof adapted to be disposed forwardly over the platform and the other tine thereof adapted to be disposed rearwardly over the platform.

3. A device as set forth in claim 2 in which the forwardly disposed tines are shorter than the rearwardly disposed tines.

4. A hay baler comprising a bale-forming chamber, a hay receiving platform extending outwardly from said bale-forming chamber, said bale-forming chamber having an opening adjacent the platform, a reciprocating plunger within said bale-forming chamber adapted to move past said opening, an endless conveyor extending along the platform and across the bale-forming chamber, a plurality of outwardly extending tines on said endless conveyor, said tines positioned at spaced intervals on said endless conveyor thereby leaving at least a portion of the endless conveyor without tines, said tines and said reciprocating plunger movable along intersecting paths, and said reciprocating plunger and the portion of the endless conveyor without tines being timed to move in the area of intersection of said paths concomitantly to preclude interference in movement of the reciprocating plunger and the tines.

References Cited in the file of this patent

UNITED STATES PATENTS

| | | |
|---|---|---|
| 894,876 | Clark | Aug. 4, 1908 |
| 1,114,681 | Duncan | Oct. 20, 1914 |
| 2,572,180 | Morrison | Oct. 23, 1951 |

FOREIGN PATENTS

| | | |
|---|---|---|
| 131,192 | Australia | Jan. 28, 1949 |